United States Patent [19]
Hedin

[11] Patent Number: 5,954,969
[45] Date of Patent: Sep. 21, 1999

[54] RECOVERY OF IRON OXIDES FROM POLLUTED COAL MINE DRAINAGE

[76] Inventor: Robert S. Hedin, 113 Shady Dr. West, Pittsburgh, Pa. 15228

[21] Appl. No.: 08/834,236

[22] Filed: Apr. 15, 1997

Related U.S. Application Data

[60] Provisional application No. 60/015,976, Apr. 15, 1996.

[51] Int. Cl.$^6$ ................................................... C02F 1/64
[52] U.S. Cl. ..................... 210/709; 210/722; 210/724; 210/747; 210/170; 210/201; 210/205; 210/253; 210/322; 423/140; 423/633
[58] Field of Search ................................ 210/96.1, 101, 210/198.1, 199, 170, 200, 709, 722, 724, 747, 201, 205, 253, 322; 423/140, 633

[56] References Cited

U.S. PATENT DOCUMENTS

| | | |
|---|---|---|
| 887,043 | 5/1908 | Heckman . |
| 1,315,836 | 9/1919 | Hoffman . |
| 1,714,828 | 5/1929 | Travers ................................ 210/722 |
| 2,151,261 | 3/1939 | Bartlett ................................ 423/35 |
| 2,656,282 | 10/1953 | Clarke . |
| 3,617,559 | 11/1971 | Cywin . |
| 3,617,560 | 11/1971 | Deul . |
| 3,617,562 | 11/1971 | Cywin . |
| 3,770,623 | 11/1973 | Seidel ................................. 210/602 |
| 4,288,328 | 9/1981 | Montgomery ..................... 210/713 |
| 5,009,793 | 4/1991 | Muller . |
| 5,110,465 | 5/1992 | McNeill, Jr. ....................... 210/199 |
| 5,128,047 | 7/1992 | Stewart et al. ..................... 210/724 |
| 5,156,746 | 10/1992 | Maree et al. ...................... 210/712 |
| 5,427,691 | 6/1995 | Kuyucak et al. . |
| 5,618,439 | 4/1997 | Allgulin .............................. 210/722 |

FOREIGN PATENT DOCUMENTS 2081122   2/1982   United Kingdom .

OTHER PUBLICATIONS

The Recovery of Marketable By–Products from Acid Mine Water; B.B. Kaplan; 1930; pp. 90–92.
Passive Treatment of Coal Mine Drainage; Information Circular 9389; Robert S. Hedin, Robert W. Nairn, and Robert L. P. Kleinmann; 1994.

Primary Examiner—Jay H. Woo
Assistant Examiner—Fred Prince
Attorney, Agent, or Firm—Webb Ziesenheim Logsdon Orkin & Hanson, P.C.

[57] ABSTRACT

A method and system is provided for producing a commercially usable iron oxide material by treating iron contaminated water. A clean effluent is also produced. Iron contaminated water is sampled to determine a bicarbonate to iron molar ratio. The flow of the water is directed to a collection basin assembly when the bicarbonate to iron molar ratio is at least 2 to 1. Iron oxide material precipitates in the collection basin assembly. The water from the collection basin assembly is directed to a constructed wetland. After a period of time, the iron oxide material in the collection basin assembly can be harvested and used for commercial purposes without excessive further treatment.

20 Claims, 2 Drawing Sheets

RECOVERY OF IRON OXIDES FROM POLLUTED COAL MINE DRAINAGE

CROSS REFERENCE OF RELATED APPLICATION

This application claims the benefit of Provisional Application No. 60/015,976 filed on Apr. 15, 1996.

BACKGROUND OF THE INVENTION

1. Field of the Invention

This invention relates generally to the production of iron oxides from flows of iron contaminated water and, more particularly, to an apparatus and method for producing a commercially marketable iron oxide product and a substantially iron free effluent from iron contaminated water.

2. Description of the Prior Art

Approximately one billion pounds of iron oxides are produced and consumed annually in the world. Iron oxides are used as pigments and colorants, where their low cost and non-hazardous characteristics are valued. Iron oxides are also used as propellants in automobile airbags, as industrial catalysts and as feed stocks to the magnetite, ferrite and toner industries. The world demand for iron oxides has recently grown by several percent per year and is expected to continue to grow over the next several decades.

Iron oxides are currently obtained from three sources. Iron oxides are mined from natural deposits, produced synthetically by the chemical industry and produced as a by-product of steel making. Natural iron oxides generally have an iron oxide content of 25–75%, with the balance of the material being alumino-silicates and associated elements. The moderate iron oxide content, the presence of contaminants and the large particle sizes limit the value of natural iron oxides unless they are intensively processed.

Iron oxides produced synthetically in chemical batch reactors produce the purest form of iron oxides and, consequently, demand the highest prices. Several processes are used to produce synthetic iron oxides. Examples of such processes are the PENNIMAN and LAUX processes in which iron oxides are produced through the oxidation of scrap iron. Because the starting materials in synthetic processes are often contaminated with other metals, the synthetic iron oxides produced are commonly contaminated with heavy metals. This condition limits their use in cosmetics, animal feeds, airbags and as industrial catalysts.

Regeneration oxides produced by steel mills as a by-product of pickling liquor have a very high iron oxide content (95–99%) but chloride contamination limits the utility of these materials. Most regeneration oxides are used as feed stocks to magnetite, ferrite and toner production processes.

The value of an iron oxide product is determined by its particular physical and chemical characteristics. For pigmenting and colorant applications, the value of the iron oxide is determined by its tinting strength, which is a direct function of the iron content and the particle size. The highest quality iron oxide pigments have iron oxide contents of greater than 90% and mean particle sizes less than 0.6 $\mu$m. Synthetic iron oxides generally meet these particle size requirements with moderate processing, while natural iron oxides have mean particle sizes on the order of 1–2 $\mu$m. The use of iron oxides in cosmetics and animal feeds as propellants in airbags and as catalysts is strictly limited by the presence of excessive concentrations of heavy metals. Both natural iron oxides and iron oxides produced synthetically from scrap iron contain concentrations of copper and chromium that are generally unsuitable for these high value uses.

Iron contaminated coal mine drainage is a common consequence of mining coal. In the United States alone, more than one billion pounds per year of iron (as FeOOH) is discharged from active and abandoned mines. Millions of dollars per day are spent in the United States to treat the polluted drainage from active and abandoned mine sites. At hundreds of additional sites where responsible parties do not exist, the contaminated water flows untreated into receiving streams. An estimated 4,000 miles of streams and rivers are polluted by untreated mine drainage in northern Appalachia alone.

Currently, iron contaminated waters are treated by active and passive treatment systems. However, these conventional treatment systems consider the metal rich product of treatment as a waste product that must be expensively disposed of. In the active systems, alkaline chemicals (such as NaOH, CaO, CaO(OH)$_2$ or Na$_2$CO$_3$) are added to the contaminated mine water to promote the formation and precipitation of metal hydroxide solids or "sludge". The resulting sludge, which commonly contains calcium sulfate, ferric hydroxide, ferrous hydroxide, aluminum hydroxide and manganese oxide is generally disposed of by burial, land filling or deep mine injection. Active treatment systems require continuous chemical additions and management of the metal hydroxide sludge. It is not unusual for treatment costs at a reclaimed medium-size mine site to be on the order of $100,000 per year. Because contaminated mine drainage generally persists for decades, a financial situation develops that strains even the most efficient mining operations. Further, the high cost of chemical systems also makes active treatment financially impractical at most abandoned mine sites.

Passive systems utilize natural chemical and biological processes to treat contaminated mine water. Passive treatment systems typically contain wetlands constructed with organic substrates and vegetated with hydrophilic species. The contaminated mine water flows into the wetlands where, under the influence of microbial, botanical and natural chemical processes, metal contaminants in the mine water precipitate to the bottom of the wetland as oxides, hydroxides, sulfides and carbonates to form a metal rich "sludge". Unlike active systems, passive systems can provide reliable water treatment with very little operation and maintenance requirements. Passive treatment however has limitations. For example, the land required for a typical passive system is generally 5–20 times greater than that for an active chemical system.

In both active and passive systems, the accumulation of the precipitate sludge decreases the effective volume of the system and degrades the water treatment capabilities. Therefore, the sludge deposits must eventually be removed and disposed of. In active systems, where metal precipitations are fast and the collection systems generally small, sludge management is a major treatment operation. Semi-annual management efforts (removal and disposal) are typical for chemical treatment operations. Passive systems have much higher sludge storage capacities and, therefore, the sludge management efforts are less frequent. Typically, passive systems are constructed with enough storage volume to allow the accumulation of 10–20 years of sludge in the wetland. Eventually, even with passive systems, the sludge will have to be removed to assure continued effective treatment of the contaminated mine water.

The potential utility of sludge produced by mine water treatment systems has been investigated. However, efforts to recover valuable metal products from mine drainage have always been stymied by the highly variable chemical composition of treatment sludges. Sludge from active treatment systems has shown potential as a soil additive or a cementing material. Even these uses, however, have proven impractical because of the variable chemical compositions of the sludges produced from differing chemical treatment systems.

The use of sludge from passive systems has been given less investigation than that from active systems. An early attempt to use the precipitate from coal mines is disclosed in U.S. Pat. No. 887,043 to Heckman. In the Heckman patent, "coal mine sulfur" discharging from a coal mine is precipitated by impounding the drainage in a crudely constructed reservoir. The precipitate that is collected is a yellow substance containing silica, sulfuric acid, iron and traces of lime and magnesia. The Heckman patent describes the use of "coal mine sulfur" for pigmenting purposes, following its calcination either alone or with sulfuric acid. The Heckman patent appears to describe the mineral Schwertmannite, a commonly occurring precipitate from acidic coal mine drainage having an iron oxide content of 60–70%. The Heckman precipitate, while containing iron oxide, differs substantially from iron oxides produced and consumed in the world today. Heckman's coal mine sulfur has negligible pigmentary value today because of its acidic, impure chemistry. Further, the Heckman patent does not describe any features of the mine water or the impoundment design that affect the quality of the precipitate, its rate of formation or its recovery.

Therefore, it is an object of the invention to provide a method and apparatus for producing a relatively high quality iron oxide product from iron contaminated water. It is a further object of the invention to provide a method and apparatus for the production of a commercial grade iron oxide product through the passive treatment of iron contaminated coal mine drainage in which the iron oxide product does not require extensive further treatment to be commercially marketable.

SUMMARY OF THE INVENTION

In order to yield a relatively high quality iron oxide product (i.e., greater than about 85% FeOOH), the method of the present invention targets waters that have a bicarbonate to iron molar ratio of at least 2 to 1. Waters with an appropriate bicarbonate to iron ratio are directed to an iron-oxide precipitation and collection basin assembly designed to maximize the efficiency of production, maximize product purity and facilitate product recovery. The water from the collection basin assembly is directed to a constructed wetland where residual iron is removed. The method discharges circumneutral water substantially uncontaminated by iron.

A treatment system of the invention for treating iron contaminated water includes a first conduit extending between and in flow communication with a contaminated water source and a collection basin assembly. A second conduit is in flow communication with the collection basin assembly and may be in flow communication with a constructed wetland. If necessary, a bicarbonate pretreatment assembly may be placed in flow communication with the contaminated water source and the collection basin assembly.

A complete understanding of the invention will be obtained from the following description when taken in connection with the accompanying drawing figures wherein like reference characters identify like parts throughout.

DESCRIPTION OF THE PREFERRED EMBODIMENTS

Figure 1:
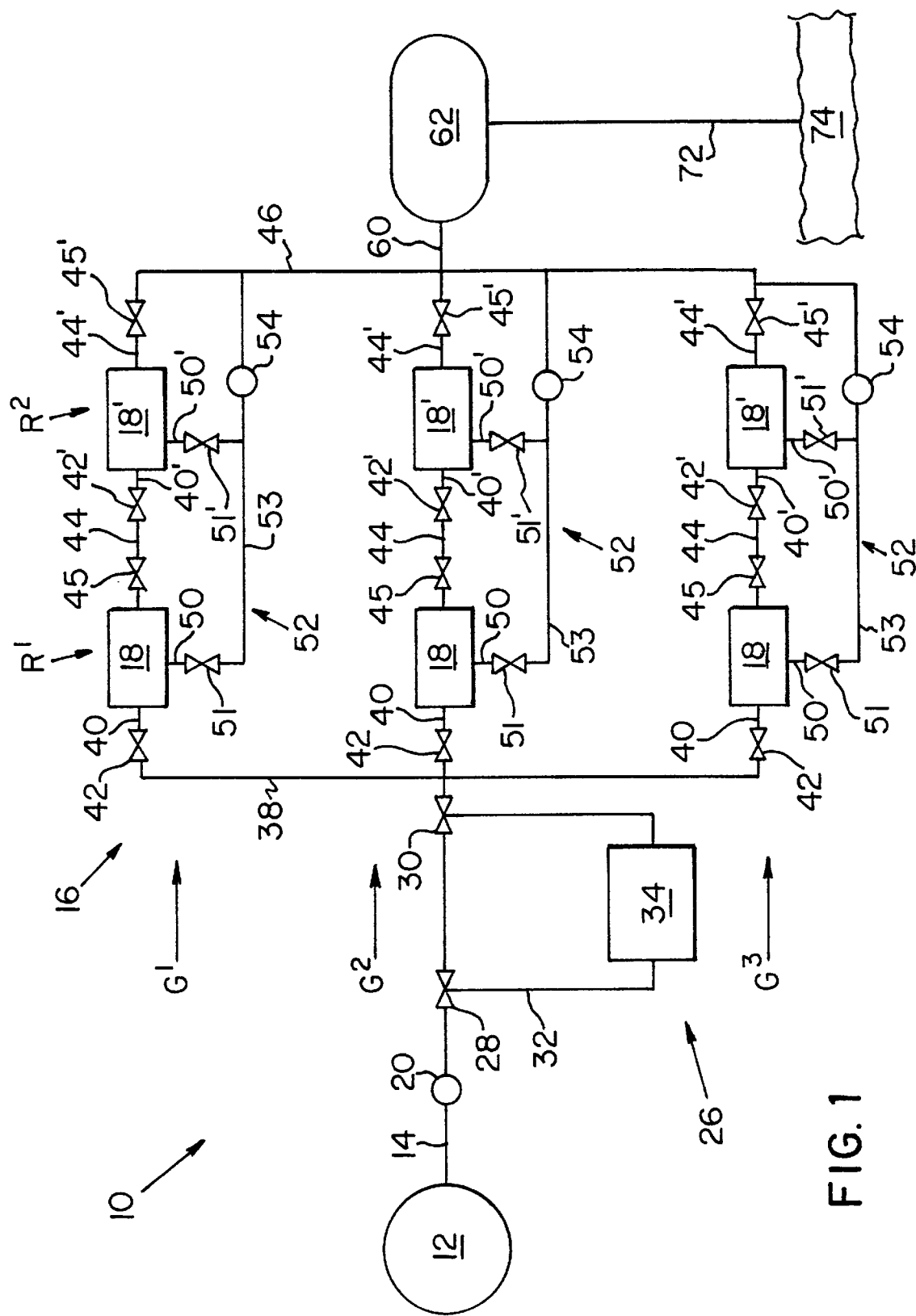
FIG. 1 is a schematic, plan view of a preferred treatment system for producing iron oxides and decreasing iron contamination in a flow of iron contaminated water.

A preferred embodiment of a treatment system of the invention is generally designated 10 in FIG. 1 of the drawings. The treatment system 10 may be placed in flow communication with a source 12 of iron contaminated water, such as mine water, when the contaminated water meets the preferred treatment criteria, as discussed hereinbelow. A first conduit 14 extends between the contaminated water source 12 and a collection basin assembly 16 having a plurality of collection basins 18. A pump 20 may be located in the first conduit 14 to pump the contaminated water from the source 12 to the collection basin assembly 16. Alternatively, the contaminated water can flow into the collection basin assembly 16 by gravity.

A bicarbonate pretreatment assembly 26 may be placed in flow communication with the first conduit 14 if the bicarbonate concentration in the contaminated water does not meet the preferred treatment criteria, as discussed hereinbelow. The bicarbonate pretreatment assembly 26 can include an inlet valve 28 and an outlet valve 30 located in the first conduit 14 and an augmentation conduit 32 extending between the inlet valve 28 and the outlet valve 30. A bicarbonate source 34, such as an anoxic limestone bed, is in flow communication with the augmentation conduit 32.

The first conduit 14 is in flow communication with an inlet header 38 of the collection basin assembly 16. The collection basin assembly 16 includes at least one collection basin 18 and, as shown in the embodiment shown in FIG. 1 of the drawings, may include a plurality of rows $R^1$, $R^2$ of collection basins 18 formed into groups $G^1$, $G^2$, $G^3$, with two collection basins 18 and 18' in each group. For purposes of description, the elements of the collection basins in the second row $R^2$ are designated with a prime (') symbol in FIG. 1 of the drawings. However, it is to be understood that the collection basins 18 and 18' are structurally identical.

Looking at the first row $R^1$, each collection basin 18 includes an inlet conduit 40 in flow communication with the inlet header 38 and having an inlet valve 42. An outlet conduit 44 having an outlet valve 45 extends from each collection basin 18 in the first row $R^1$. The outlet conduit 44 of each collection basin 18 in the first row $R^1$ is in flow communication with the inlet valve 42' of the adjacent collection basin 18' in the second row $R^2$. Each collection basin 18' in the second row $R^2$ is in flow communication with an outlet header 46 via their respective outlet conduits 44' and outlet valves 45'. The collection basins 18, 18' have drainage conduits 50, 50' having drainage valves 51, 51'. The drainage conduits 50, 50' are connected to a drainage assembly 52 in flow communication with the outlet header 46 via a main drain conduit 53. The drainage assembly 52 preferably includes a connection suitable for a drainage pump 54. The structure of the collection basins 18, 18' is described in more detail hereinbelow.

A second conduit 60 extends between the outlet header 46 of the collection basin assembly 16 and a constructed wetland 62. The constructed wetland 62 is of conventional type and includes an organic substrate having emergent wetland species planted therein. A wetland discharge conduit 72 extends between the constructed wetland 62 and a non-contaminated water area, such as a stream 74.

Figure 2:
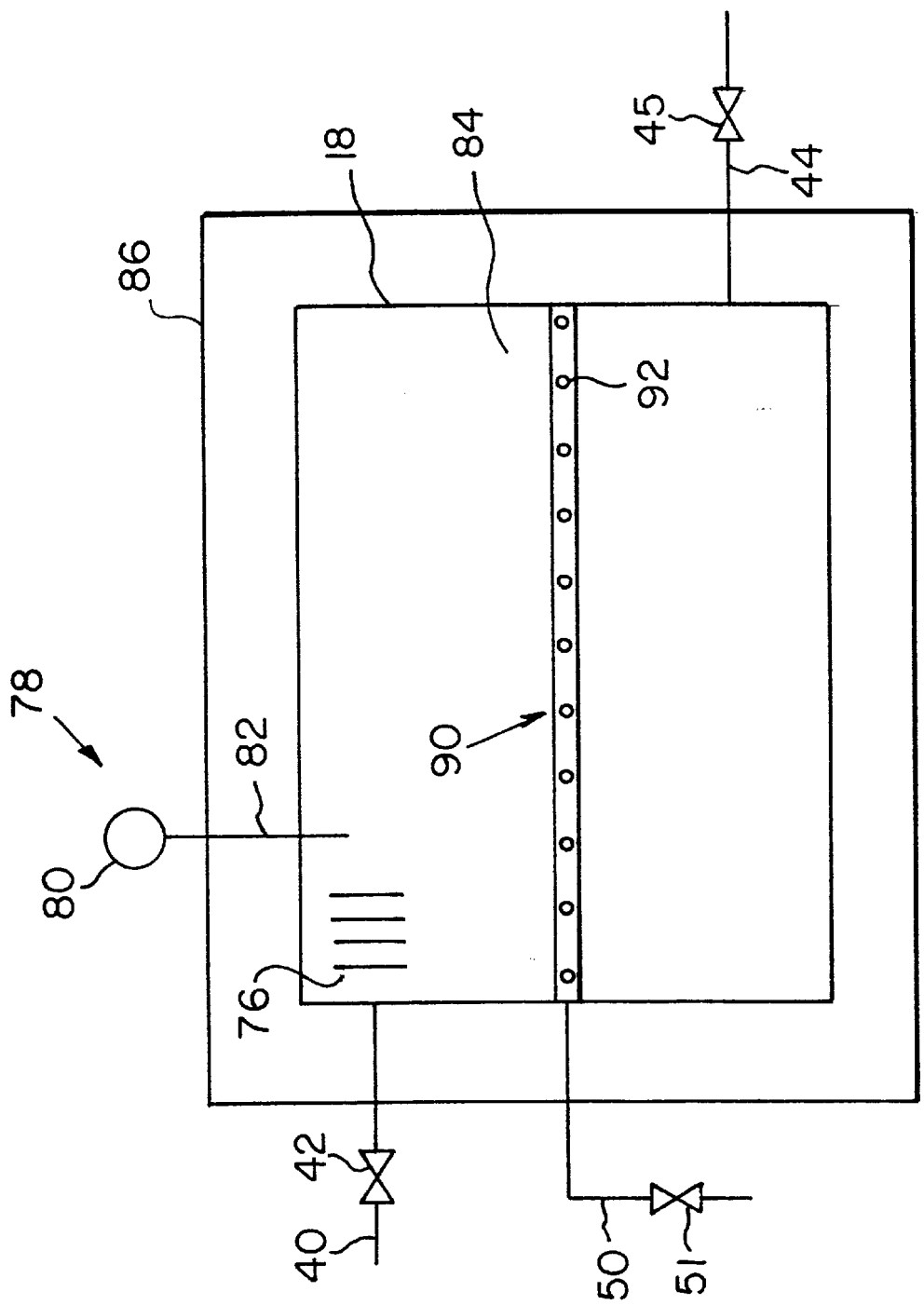
FIG. 2 is a plan view of an iron oxide collection basin of the invention.

A collection basin 18 is shown in FIG. 2 of the drawings. The collection basin 18 includes a passive aeration device, such as aeration steps 76 located near the discharge of the inlet conduit 40. Alternatively, an aeration assembly 78 may be connected to the collection basin 18. The aeration assembly 78 can be of any conventional type, such as an aeration pump 80 having an aeration conduit 82 in flow communication with the interior of the collection basin 18. The collection basin 18 also includes a liner 84, such as a plastic liner. A wall or elevated berm 86 surrounds the collection basins 18, 18'.

Each collection basin 18 includes a plumbing system 90. The plumbing system 90 includes at least one perforated conduit 92 which extends along the length of the collection basin 18 on top of the liner 84. The plumbing system 90 is in flow communication with the drainage conduit 50.

Operation of the treatment system 10 and the treatment method of the invention will now be described. Water containing more than 20 mg/l dissolved iron is first assessed for its suitability for producing high quality iron oxides. Samples of the water are collected from a source of contaminated water and analyzed for concentrations of bicarbonate and dissolved iron by standard analytical techniques. If the molar ratio of bicarbonate to iron exceeds about 2.0, the water is considered suitable for iron oxide production without alkaline pretreatment and is directed to the collection basin assembly 16 through the first conduit 14.

If the molar ratio of bicarbonate to iron is less than about 2.0, methods for pretreating the water and increasing its bicarbonate content are assessed. Additional chemical analyses are conducted, as needed, to assess the feasibility of various bicarbonate-increasing techniques. One technique that is known to be effective is the anoxic treatment of the water with a buried bed of limestone aggregate. This technique, however, is limited to waters that are anoxic and contain less than 1 mg/l dissolved aluminum. In the case of iron contaminated mine waters, this assessment process will eliminate many sites from further consideration for iron oxide production. If the water is assessed suitable for iron oxide production and the bicarbonate to iron molar ratio is less than about 2 to 1, a bicarbonate augmentation system, such as the bicarbonate pretreatment system 26, is placed in flow communication with the first conduit 14 to direct the water through the augmentation conduit 32 and the bicarbonate source 34 before discharging the water into the collection basin assembly 16.

Water, either directly from the source 12 or from the bicarbonate pretreatment system 26 depending on the bicarbonate to iron molar ratio, flows through the first conduit 14 and inlet header 38 into the collection basin assembly 16. Assuming all of the inlet valves 42 of the collection basins 18 in the first row $R^1$ are open, water flows into the first row collection basins 18 of each group $G^1$, $G^2$ and $G^3$. The influent is preferably aerated by passive means, such as by falling over the aeration steps 76. Alternatively, the water may be aerated mechanically by the aeration assembly 78.

In the collection basins 18, relatively high quality iron oxide material (i.e., having greater than about 85% FeOOH) begins to precipitate onto the liner 84 in the collection basin 18. The total surface area of the collection basins 18, 18' is calculated from the iron loading of the source water, expressed as lb. of FeOOH per day, with an expectation that the basins 18, 18' will precipitate iron oxide at a rate of 285–430 lb. FeOOH per acre per day. The liner 84 prevents contamination of the precipitated iron oxide from underlying soils, discourages plant growth by acting as a root barrier and facilitates iron oxide recovery operations. The preferred liner 84 is constructed from plastic. The elevated berm 86 surrounding each basin 18 diverts surface water and ensures that the iron oxide product is not contaminated by sediment carrying surface waters. Additionally, vegetation and organic matter is preferably excluded from the area of the collection basins since it may tend to contaminate the precipitated iron oxide material. The flow rate of water through the collection basins 18, 18' is preferably controlled to achieve a retention time of about 12–24 hours.

While the iron oxide recovery system of the invention will contain at least one collection basin 18, most systems will have about 2–25 basins 18. The preferred shape of the basins 18 is rectangular, with at least a 3 to 1 length to width ratio. The preferred size of the individual basins 18 is 10,000–40,000 ft$^2$. However, both the shape and the size of the basins 18 may vary outside these preferred ranges due to uncontrollable constraints of the treatment site. The number and arrangement of the basins 18 is determined by the iron concentrations and flow rate of the process water. Where iron concentrations are less than 50 ppm, the preferred configuration is one with a plurality of collection basins 18 arranged in parallel. Where iron concentrations are greater than 50 ppm, the preferred configuration is at least two sets of parallel basins 18 arranged serially, as shown in FIG. 1 of the drawings. The basins 18 are designed to optimize iron oxide precipitation and facilitate recovery of the iron oxide product.

In the embodiment shown in FIG. 1 of the drawings, the water discharged from the collection basins 18 of the first row $R^1$ is directed to the inlet conduit 40' of an adjacent collection basin 18' in the second row $R^2$ and into that second row collection basin 18' to allow further precipitation of iron oxide material. Water from the collection basins 18' of the second row $R^2$ flows out of the respective outlet conduits 44' and into the outlet header 46.

The water from the outlet header 46 flows through the second conduit 60 and into the constructed wetland 62. The constructed wetland 62 is of conventional type, being constructed with an organic substrate and planted with emergent wetland species. The constructed wetland 62 is not intended for iron oxide recovery. The constructed wetland does not have a liner or pipes that allow manipulation of water depths. The total surface area of the constructed wetlands is calculated from the expectation that the collection basin assembly 16 will discharge water containing about 15 ppm iron and the constructed wetland 62 will remove iron at a rate of about 100–140 lb. of Fe per acre per day.

The water discharged from the constructed wetland flows through the conduit 72 and into the stream 74. The process described will discharge water with a pH of about 6–8 and iron concentrations less than about 3 ppm.

The flow of water through the entire system 10 preferably occurs by gravity. However, circumstances specific to each site may require the operation of water pumps. In particular, the controlled collection of iron contaminated water from underground coal mines often requires pumping. FIG. 1 of the drawings shows an optional pump 18 that moves iron contaminated water from the source either directly to the collection basin assembly 16 or to the bicarbonate pretreatment system 26.

Eventually, for example, after a period of about 2–5 years, the iron oxide product precipitated in the collection basins 18, 18' can be harvested. As discussed above, each collection basin 18 contains a plumbing system 90 that allows the basin 18 to be drained in order to harvest the iron oxide product. The preferred arrangement of the plumbing system 90 includes a minimum of one line of perforated plastic conduit 92 which extends the length of the basin 18 on top of the liner 84. The conduit 92 is connected to the drainage conduit 50 which extends through the berm 86. When the drainage valve 51 is closed, water discharges from the basin 18 through the outlet conduit 44 in the standard effluent structure. When the valve 51 is open, water drains from the bottom of the basin 18 exposing and partially dewatering the collected iron oxide product. A drainage pump 84 can be connected to the plumbing system 90 to accelerate the drainage process.

A preferred form of the outlet conduit 44 is a 12–18 inch diameter plastic pipe positioned about 6 inches above the bottom of the collection basin 18 and extending through the berm 86. Outside the berm 86, the pipe is connected to adjustable risers whose elevation determines the elevation and depth of water in the collection basin 18.

The collection basins 18 are preferably about 12–36 inches deep. The bottoms of the basins 18 are constructed on a grade to promote drainage during iron oxide recovery stages. The preferred slope is about a 1% rising toward the discharge end. This design provides for a more rapid precipitation at the influent end of the collection basin 18 where the water is well aerated and iron concentrations are highest. The basins provide an ideal environment for iron oxide formation, precipitation and subsequent recovery.

The actual recovery of iron oxide sludge from each basin 18 occurs by closing the inlet valve 42 for that basin 18 which stops flow of iron contaminated water into that collection basin 18. The water remaining in the collection basin 18 is drained through the plumbing system 90 and drainage assembly 52 to expose and partially dewater the sludge. The sludge remains in situ to be partially dried by natural methods. After the sludge is partially dried, the sludge is removed from the liner 84 by conventional methods, such as shoveling, and is collected. Thereafter, the inlet valve 42 is reopened to provide further iron oxide recovery. The collected iron oxide material may be further dried, sieved or crushed if desired. However, extensive further processing of the iron oxide material is not necessary to produce a commercially marketable iron oxide product.

As will be appreciated from FIG. 1 of the drawings, the inlet valves 42 and outlet valves 45 of the individual collection basins 18 can be selectively opened and closed to selectively isolate individual collection basins 18 or groups $G^1$, $G^2$, $G^3$ of collection basins 18, 18' so that, for example, one group $G^1$ of collection basins 18, 18' can be isolated drained while the other groups $G^2$ and $G^3$ of basins 18, 18' remain on-line to receive the flow of contaminated water.

It will be understood from the above description that I have invented a new process for producing commercial grade iron oxides with approximately 90% FeOOH content and very low concentrations of copper and chromium. The iron oxides are precipitated from iron contaminated liquid streams by assuring a bicarbonate-buffered chemical environment and retaining the aerated liquid in shallow precipitation basins designed to minimize the input of contaminates, allow manipulations that improve the efficiency of iron oxide production and facilitate the easy removal of iron oxide products. A consequence of my iron oxide production process is decreased dissolved iron concentrations in the treated water and, hence, improved water quality. By directing the effluent of iron oxide collection basins through a properly designed constructed wetland, residual iron is removed and the resulting liquid discharge is substantially non-contaminated by iron. For industries where water with elevated iron concentrations is a liability that requires treatment, such as the mining industry, my process provides both water treatment and iron oxide production capabilities.

While preferred embodiments of the invention have been described in detail herein, it will be appreciated by those skilled in the art that various modifications and alternatives to the preferred embodiments may be developed in light of the overall teaching of the disclosure. Accordingly, the particular arrangements are illustrative only and are not limiting as to the scope of the invention which is to be given the full breadth of the appended claims and any and all equivalents thereof.

I claim:

1. A method for producing and recovering an iron oxide material from alkaline, iron containing water, comprising the steps of:

sampling the iron containing water to determine a bicarbonate to iron molar ratio;

transporting the sampled water to a collection basin assembly having at least one collection basin when the bicarbonate to iron molar ratio is at least about 2 to 1;

preventing contamination of the sampled water in the collection basin assembly;

precipitating an iron oxide material in the at least one collection basin; and recovering the precipitated iron oxide material by removing the precipitated iron oxide material from the at least one collection basin.

2. The method as claimed in claim 1, including transporting the water from the collection basin assembly to a constructed wetland.

3. The method as claimed in claim 1, including transporting the sampled water to a bicarbonate pretreatment system when the bicarbonate to iron molar ratio is less than about 2 to 1 to raise the bicarbonate to iron molar ratio to at least about 2 to 1 and then transporting the water from the bicarbonate pretreatment system to the collection basin assembly.

4. The method as claimed in claim 1, including stopping the flow of contaminated water into the at least one collection basin and draining the water from the at least one collection basin to expose and at least partially dewater the iron oxide material.

5. The method as claimed in claim 1, wherein the collection basin assembly includes a plurality of collection basins and including the step of transporting water from a first collection basin to a second collection basin in the collection basin assembly.

6. The method as claimed in claim 1, wherein the collection basin assembly includes a first collection basin in flow communication with a second collection basin and including the steps of:

selectively isolating the first collection basin from the second collection basin so that no water flows into the first collection basin;

draining the water from the first collection basin to expose and partially dewater precipitated iron oxide material in the first collection basin;

removing the precipitated iron oxide material from the first collection basin; and restarting the flow of contaminated water into the first collection basin.

7. The method as claimed in claim 2, including discharging the water from the constructed wetland.

8. The method as claimed in claim 6, including:
selectively isolating the second collection basin from the first collection basin so that no water flows into the second collection basin;
draining the water from the second collection basin to expose and partially dewater precipitated iron oxide material in the second collection basin;
removing the precipitated iron oxide material from the second collection basin; and
restarting the flow of contaminated water into the second collection basin.

9. A treatment system for producing and recovering iron oxide material from alkaline, iron containing water, comprising:
a collection basin assembly having at least one collection basin;
a first conduit extending between and in flow communication with a source of iron containing water and the collection basin assembly;
a second conduit in flow communication with the collection basin assembly;
a wetland in flow communication with the second conduit; and
means for recovering precipitated iron oxide material from the at least one collection basin.

10. The system as claimed in claim 9, including a constructed wetland, wherein the second conduit is in flow communication with the constructed wetland.

11. The system as claimed in claim 9, including a bicarbonate pretreatment assembly in flow communication with the iron containing water source and the collection basin assembly.

12. The system as claimed in claim 9, including a wetland discharge conduit in flow communication with the constructed wetland.

13. The system as claimed in claim 9, wherein the at least one collection basin is in flow communication with a drainage assembly to drain water from the at least one collection basin.

14. The system as claimed in claim 9, wherein the at least one collection basin includes a liner.

15. The system as claimed in claim 9, wherein the at least one collection basin includes aerating steps.

16. The system as claimed in claim 9, including a berm surrounding the at least one collection basin to prevent surface water entering the collection basin.

17. The system as claimed in claim 9, wherein the collection basin assembly includes an inlet header, an outlet header, a plurality of collection basins in flow communication with the inlet header and the outlet header, and means for selectively isolating the flow of iron containing water to selected ones of the collection basins.

18. The system as claimed in claim 13, wherein the drainage assembly includes a perforated conduit located in said at least one collection basin, with the perforated conduit in flow communication with a drainage conduit of the at least one collection basin.

19. A treatment system for producing and recovering an iron oxide material from iron containing water, comprising;
means for sampling the iron containing water to determine a bicarbonate to iron molar ratio;
means for transporting the sampled water to a collection basin assembly having at least one collection basin when the bicarbonate to iron molar ratio is at least about 2 to 1;
means for preventing contamination of the sampled water in the collection basin assembly;
means for precipitating an iron oxide material in the at least one collection basin; and
means for recovering the precipitated iron oxide material.

20. The method as claimed in claim 1, wherein the precipitated iron oxide material is a commercial grade iron oxide with approximately 90% FeOOH content by weight.

* * * * *

UNITED STATES PATENT AND TRADEMARK OFFICE
CERTIFICATE OF CORRECTION

PATENT NO. : 5,954,969
DATED : September 21, 1999
INVENTOR(S) : Robert S. Hedin

It is certified that error appears in the above-identified patent and that said Letters Patent is hereby corrected as shown below:

Column 6 Lines 18-19 "40," and "000" should read --40,000--.

Column 7 Lines 52-53 "isolated drained" should read --isolated and drained--.

Column 10 Line 22, Claim 19, "comprising;" should read --comprising:--.

Signed and Sealed this

Twenty-third Day of May, 2000

Attest:

Q. TODD DICKINSON

*Attesting Officer*    *Director of Patents and Trademarks*